(12) United States Patent
House et al.

(10) Patent No.: US 6,202,200 B1
(45) Date of Patent: *Mar. 13, 2001

(54) MULTI-TIER DEBUGGING

(75) Inventors: Daniel Edward House, San Jose; Constance Jane Nelin, Monte Sereno, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/458,174

(22) Filed: Dec. 9, 1999

Related U.S. Application Data

(63) Continuation of application No. 08/828,481, filed on Mar. 31, 1997, now Pat. No. 6,061,517.

(51) Int. Cl.[7] .................................................... G06F 9/45
(52) U.S. Cl. ........................ 717/4; 717/1; 709/203; 709/217; 707/10; 707/104; 345/346; 345/356; 345/332
(58) Field of Search ........................... 717/4, 1; 709/203, 709/217; 345/346, 356, 340, 352, 332; 707/10, 104, 514

(56) References Cited

U.S. PATENT DOCUMENTS

| | | |
|---|---|---|
| 4,855,906 | 8/1989 | Burke . |
| 5,048,018 | 9/1991 | Bernstein et al. . |
| 5,168,441 | 12/1992 | Onarheim et al. . |
| 5,179,698 | 1/1993 | Bachman et al. . |
| 5,193,182 | 3/1993 | Bachman et al. . |
| 5,193,183 | 3/1993 | Bachman . |
| 5,195,178 | 3/1993 | Krieger et al. . |
| 5,241,645 | 8/1993 | Cimral et al. . |
| 5,249,300 | 9/1993 | Bachman et al. . |
| 5,410,648 | 4/1995 | Pazel . |
| 5,457,797 | 10/1995 | Butterworth et al. . |
| 5,561,763 | 10/1996 | Eto et al. . |
| 5,737,592 | 4/1998 | Nguyen et al. . |
| 5,781,778 | 7/1998 | Meier et al. . |
| 5,794,046 | 7/1998 | Meier et al. . |
| 5,802,371 | 9/1998 | Meier . |
| 5,802,514 | 9/1998 | Huber . |
| 5,809,248 | 9/1998 | Vidovic . |

(List continued on next page.)

OTHER PUBLICATIONS

"1995 Database Buyer's Guide and Client/server sourcebook", DBMS, v8, n6, p72(29).

"Crossing the bridge into enterprise computing." (Product Support).

Linthicum, David S., "Selecting a client/server application development tool." DBMS, v9, n8, p41(5).

"Centura Ships Centura Web Developer; Complete Web Development Environment for Transaction–Intensive Applications"; Business Wire; pp. 03190344.

Carone, T.; "Middleware and Three–Tier Client/Server Development"; Dr. Dobbs Journal; pp. 16–22.

Hijazi, N.; "Examining Forte Express"; Dr. Dobbs Journal; pp. 86–91.

Cheng, D.; Hood, R.; "A Portable Debugger for Parallel and Distributed Programs"; Processing of Supercomputing '94; pp. 723–732.

*Primary Examiner*—Kakali Chaki
*Assistant Examiner*—Tuan Q. Dam
(74) *Attorney, Agent, or Firm*—Gates & Cooper

(57) ABSTRACT

A method, apparatus, and article of manufacture for providing a programming development environment that supports the development of Internet and Intranet applications. More specially, the present invention discloses a multi-tier debugger that allows the debugging of applications executing on multiple tiers at the same time, when the tiers are on separate machines or when the tiers are on a single machine. The debugger is split into a window module and a runtime module.

39 Claims, 5 Drawing Sheets

U.S. PATENT DOCUMENTS

| | | |
|---|---|---|
| 5,815,653 | 9/1998 | You et al. . |
| 5,819,093 | 10/1998 | Davidson et al. . |
| 5,838,910 | 11/1998 | Domenikos et al. . |
| 5,875,322 * | 2/1999 | House et al. .......................... 712/220 |
| 5,881,230 | 3/1999 | Christensen et al. . |
| 5,883,626 * | 3/1999 | Glaser et al. ....................... 345/342 |
| 5,889,520 | 3/1999 | Glaser . |
| 5,890,158 * | 3/1999 | House et al. ........................... 707/10 |
| 5,911,075 * | 6/1999 | Glaser et al. ............................ 707/2 |
| 5,933,639 | 8/1999 | Meier et al. . |
| 5,940,593 * | 8/1999 | House et al. .............................. 717/4 |
| 5,953,525 * | 9/1999 | Glaser et al. ............................ 717/1 |
| 5,953,731 * | 9/1999 | Glaser .................................. 707/513 |
| 5,953,761 | 9/1999 | Glaser . |
| 5,956,036 * | 9/1999 | Glaser et al. ........................ 345/356 |
| 6,058,264 * | 5/2000 | Glaser ...................................... 717/2 |
| 6,061,517 * | 5/2000 | House et al. .............................. 717/4 |
| 6,069,627 * | 5/2000 | Conrad et al. ....................... 345/347 |

* cited by examiner

MULTI-TIER DEBUGGING

This application is a Continuation of application Ser. No. 08/828,481, filed Mar. 31, 1997, now U.S. Pat. No. 6,061,517, entitled 'MULTI-TIER DEBUGGING', which application is incorporated herein by reference.

CROSS-REFERENCE TO RELATED APPLICATIONS

This application is related to the following co-pending and commonly-assigned patent applications:

Application Ser. No. 08/828,854 entitled "PROGRAMMING DEVELOPMENT ENVIRONMENT FOR INTRANET AND INTERNET APPLICATIONS EMPLOYING UNIQUE PROJECT DATA STRUCTURE," filed on same date herewith, by Daniel E. House, Brian J. Owings, and Shiau-Shiau Pei;

Application Ser. No. 08/828,476 entitled "SHARED OBJECT MODEL," filed on same date herewith, by Brian J. Owings, Shiau-Shiau Pei, and Daniel E. House, now U.S. Pat. No. 5,890,158;

Application Ser. No. 08/828,480 entitled "REMOTE SCRIPTING OF LOCAL OBJECTS," filed on same date herewith, by Daniel E. House, Constance J. Nelin, and Rebecca B. Nin;

Application Ser. No. 08/828,989 entitled "METHOD AND APPARATUS FOR SIMULATING A MULTI-TIERED COMPUTER ENVIRONMENT," filed on same date herewith, by Daniel E. House and Constance J. Nelin, now U.S. Pat. No. 5,940,593;

Application Ser. No. 08/828,478 entitled "MULTI-TIER VIEW PROJECT WINDOW," filed on same date herewith, by Howard J. Glaser, Daniel E. House, and Constance J. Nelin, now U.S. Pat. No. 5,953,525;

Application Ser. No. 08/829,104 entitled "EXTENDER USER INTERFACE," filed on same date herewith, by Thomas E. Conrad, Howard J. Glaser, Jean C. Ho, James L. Keesey, Constance J. Nelin, and Gerold J. Wilmot, now U.S. Pat. No. 6,069627;

Application Ser. No. 08/828,846 entitled "SHARED MODULES GRAPHICAL USER INTERFACE," filed on same date herewith, by Howard J. Glaser, Daniel E. House, and Constance J. Nelin, now U.S. Pat. No. 5,956,036;

Application Ser. No. 08/828,479 entitled "QUERY SELECTION FOR A PROGRAM DEVELOPMENT ENVIRONMENT," filed on same date herewith, by Howard J. Glaser and Mary C. Lehner, now U.S. Pat. No. 5,911,075;

Application Ser. No. 08/828,477 entitled "DOCKING AND FLOATING MENU/TOOL BAR," filed on same date herewith, by Howard J. Glaser, Stewart E. Nickolas, and Karl D. Johnson, now U.S. Pat. No. 5,883,626;

Application Ser. No. 08/828,890 entitled "HTML INTEGRATION UTILITY FOR A PROGRAM DEVELOPMENT ENVIRONMENT," filed on same date herewith, by Howard J. Glaser, now U.S. Pat. No. 5,953,731;

Application Ser. No. 08/828,897 entitled "EXTENDER SMART GUIDE," filed on same date herewith, by Howard J. Glaser, now U.S. Pat. No. 6,058,264; and Application Ser. No. 08/828,990 entitled "DYNAMIC DISCOVERY OF CONTROLS," filed on same date herewith, by Daniel E. House and Constance J. Nelin, now U.S. Pat. No. 5,875,322;

all of which applications are incorporated by reference herein.

BACKGROUND OF THE INVENTION

1. Field of the Invention

This invention relates in general to programming development environments performed by computers, and in particular, to the use of a programming development environment for Internet and Intranet applications.

2. Description of Related Art

With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language result in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American National Standards Organization (ANSI) and the International Standards Organization (ISO).

Thus, there is a need in the art for methods of accessing RDBMS software across an Internet or Intranet, and especially via Web-based networks. Further, there is a need for simplified development environments for such systems.

SUMMARY OF THE INVENTION

To overcome the limitations in the prior art described above, and to overcome other limitations that will become apparent upon reading and understanding the present specification, the present invention discloses a method, apparatus, and article of manufacture for providing a programming development environment that supports the development of Internet and Intranet applications. More specifically, the present invention discloses a multi-tier debugger that allows the debugging of applications executing on multiple tiers at the same time, when the tiers are on separate machines or when the tiers are on a single machine. The debugger is split into a window module and a runtime module.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
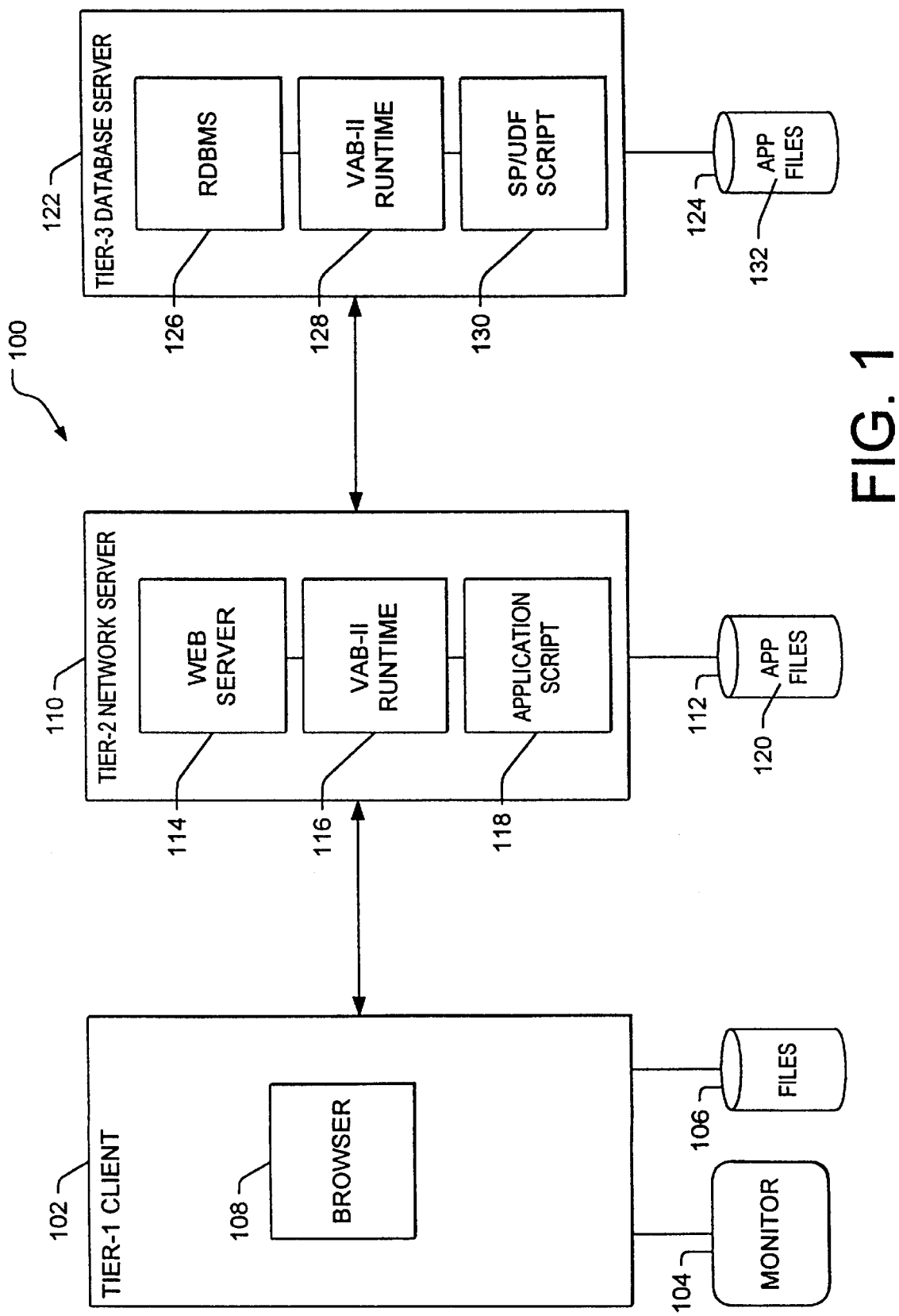
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs.

Figure 2:
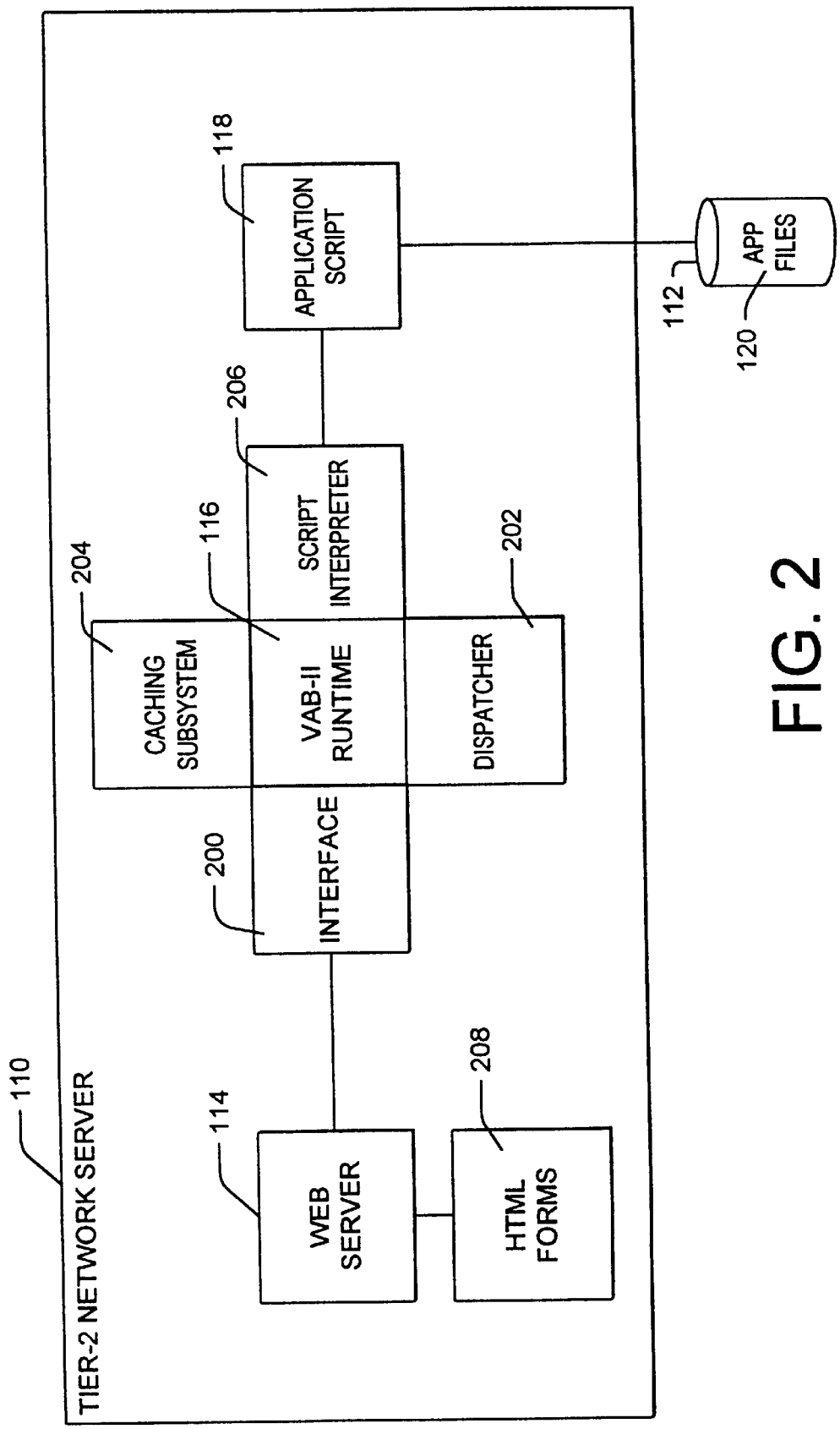
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
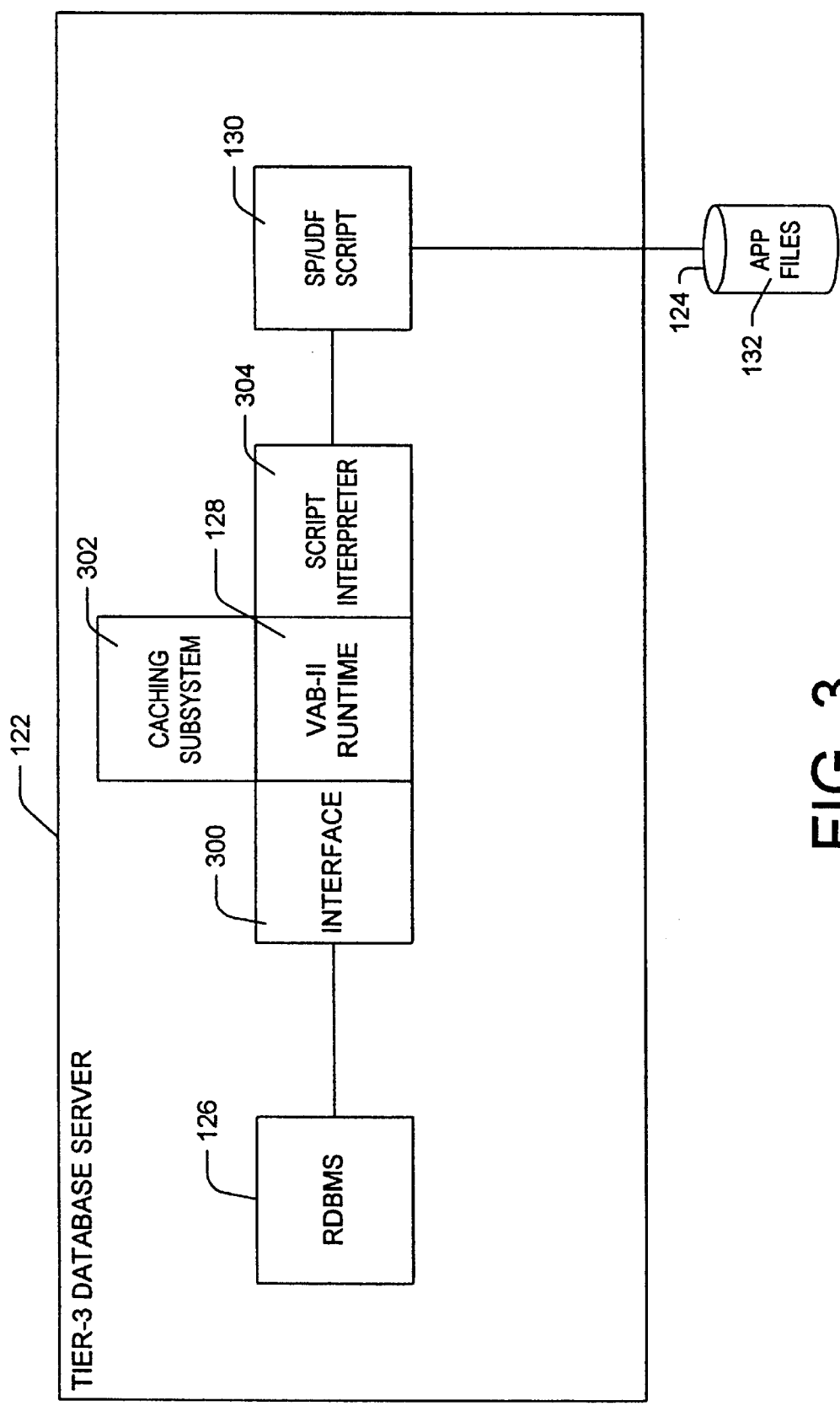
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from one or more APP files 132 stored on the data storage device 124. No dispatcher is required for the VAB-II runtime module 128 in the database server 122. The interface 300 provides a mechanism for invoking the database server 126 from the VAB-II runtime module 128 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
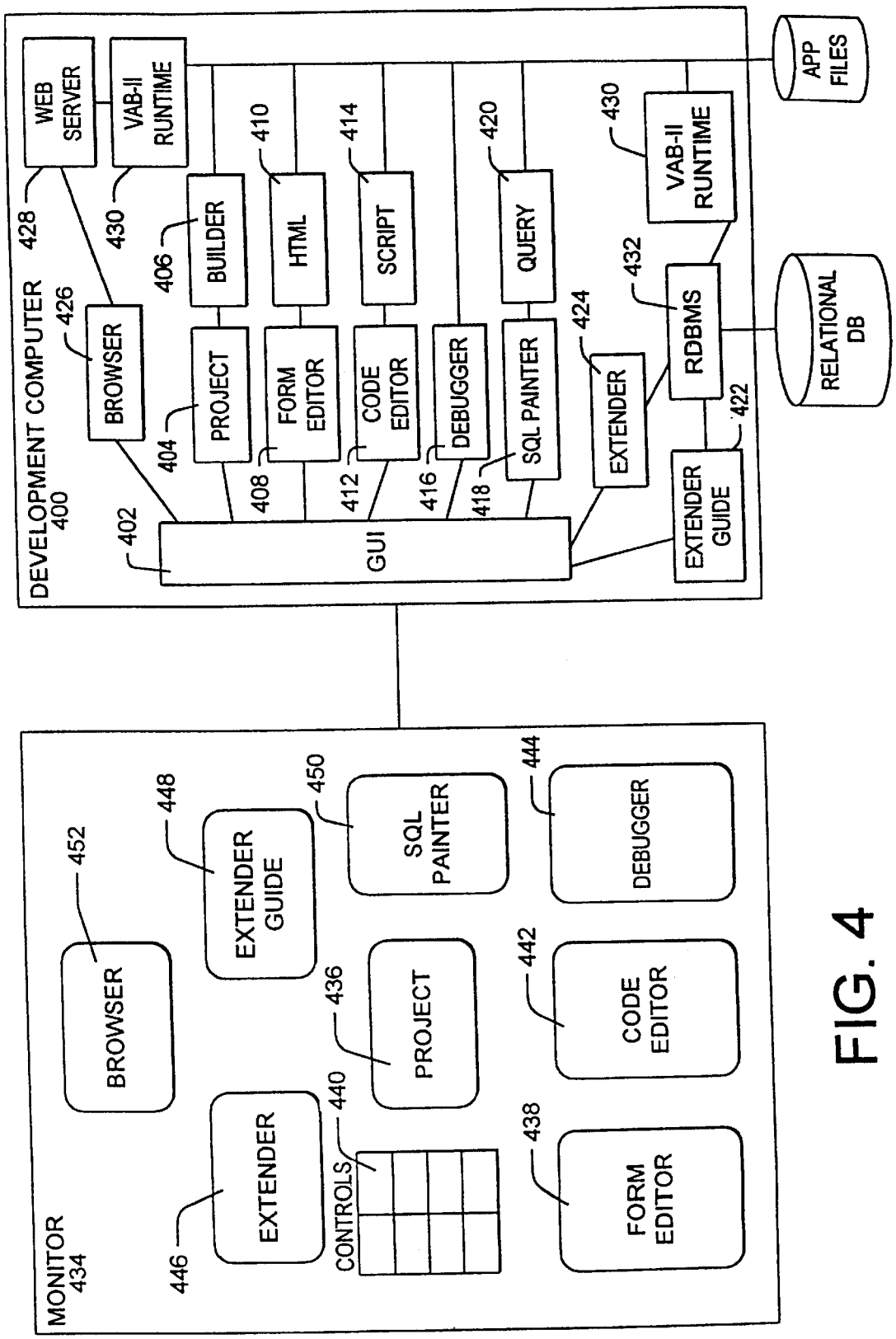
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Multi-Tier Debugging

Figure 5:
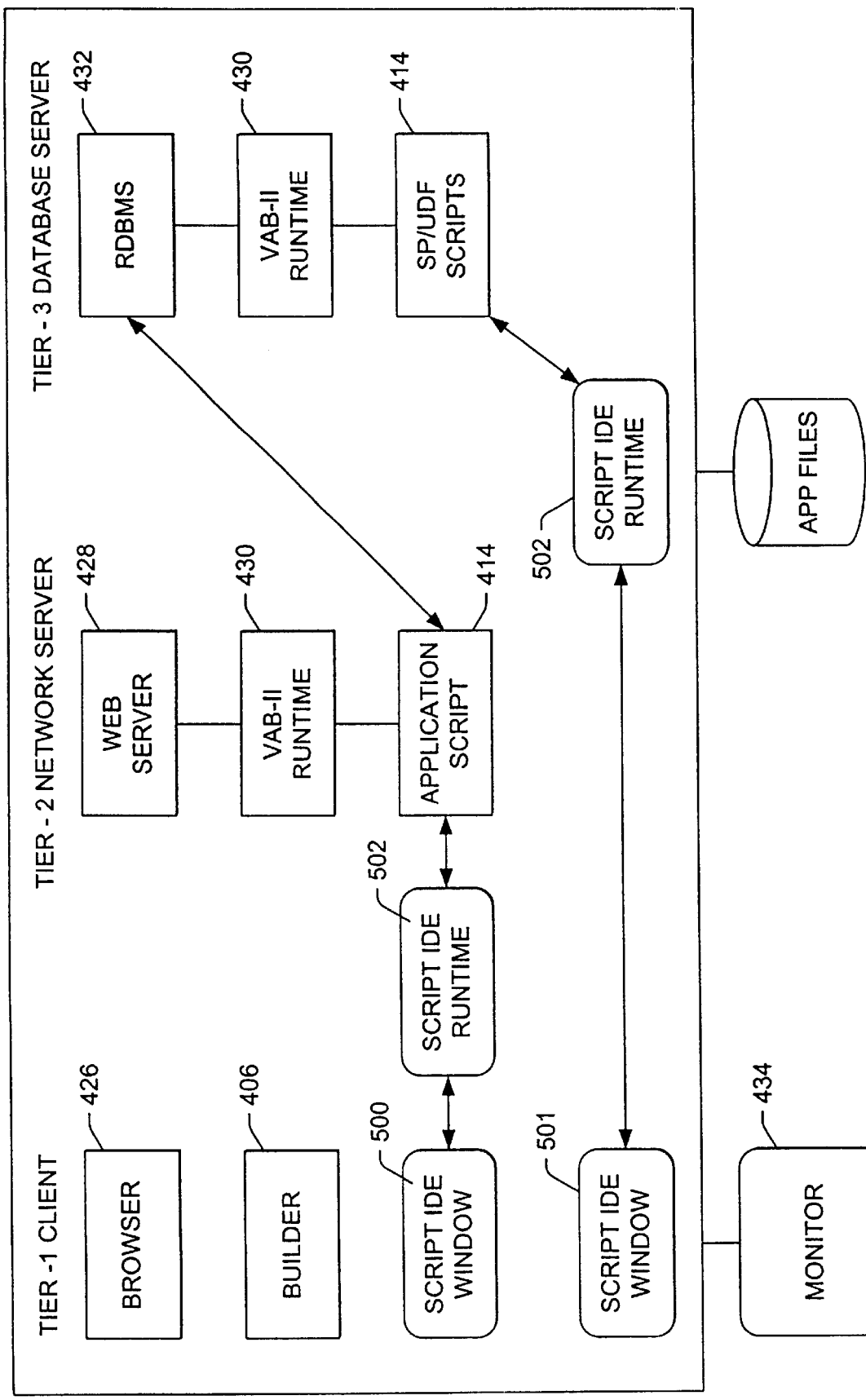
FIG. 5 is a block diagram that illustrates the multitier nature of the debugger executed by the development computer according to the present invention.

FIG. 5 is a block diagram that further illustrates the multi-tier nature of the debugger 444 executed by the development computer 400 according to the present invention. The present invention allows the debugging of multiple tiers at the same time, when the tiers are on separate machines or when the tiers are on a single machine. The debugger 444 uses a debug facility from the LotusScript Integrated Development Environment (IDE), but splits the debug facility into a window or graphical user interface module 500 and a runtime module 502.

As indicated above, the programming logic in the present invention runs in tier-2 (as an application script 414) and tier-3 (as an SP/UDF script 414), and is driven by user interactions with the browser 426 in tier-1. At the same time, a plurality of LotusScript IDEs are executed by the development computer 400, wherein each IDE includes a window module 500 and a runtime module 502. The IDEs support source level debugging, which allows users to set breakpoints and modify variables.

In the example of FIG. 5, a first window module 500 and first runtime module 502 are executed on the development computer 400 for the tier-2 application script 414, so that breakpoints can be set and variables modified. Similarly, a second window module 500 and second runtime module 502 are executed on the development computer 400 for the tier-3 SP/UDF script 414, so that breakpoints can be set and variables modified. As the user interacts with controls in the HTML page displayed by the browser 426, the application script 414 and SP/UDF script 414 are executed and breakpoints within the scripts 414 are triggered within the first and second window modules 500 and runtime modules 502, respectively.

In the present invention, the development computer 400 is intended to mimic a production environment as much as possible. The same components are used and the same logic is driven. This enables the components to be designed and implemented once, rather than implemented multiple times. It also enables the developer to have very high confidence that the testing being done reflects the actual environment in which the application will eventually run when published on multiple tiers.

Debugging prior to production (i.e., prior to when the application has been published to servers) is virtually identical to debugging in production. The same modules and structures are used. This enables developers to test scripts in a development environment that is functionally identical to the production environment.

Run Local/Run Remote

The development computer 400 also provides a "Run Local/Run Remote" function under the builder 406 that supports the multi-tier debugging facility of the present invention.

"RunLocal" is the function selected to run the application on the local development computer 400 (and prepare for debugging it). The application is essentially "completed" by generating the appropriate HTML and storing it under a directory representing this application where the local web sever 428 can access it for display to the local browser 426. In addition, the application script 414 is "published" to the local machine in a place where the local VAB-II runtime module 430 can execute the script 414, and the builder 406 and debugger 444 can debug the script.

Similarly, "RunRemote" is the function selected to run the application on a remote network server (and prepare for debugging it). The "RunRemote" function executes the browser 426 and points it at the Universal Resource Locator (URL) describing the first page of an application which has already been published on some network server (if the application was not published using the project window, the user must type this URL into the browser). Any special debugging parameters are inserted into the URL automatically. The major differences between RunRemote and simply running the application by typing in the URL in the browser 426 are: (1) the project window 436 is displayed and (2) debug information is automatically inserted in the URL. These are preparations for debugging the application remotely. A window module 500 will be displayed so that breakpoints, etc., can be specified and triggered as soon as the tier-2 script 414 is invoked. Likewise, a window module 500 will be displayed so that breakpoints, etc., can be specified and triggered as the tier-3 script 414 is invoked. Both of these "automatic debugger windows" are optional.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for providing a programming development environment that supports the development of Internet and Intranet applications. More specifically, the present invention discloses a multi-tier debugger that allows the debugging of applications executing on multiple tiers at the same time, when the tiers are on separate machines or when the tiers are on a single machine. The debugger is split into a window module and a runtime module.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented Rapid Application Development (RAD) tool for constructing client-server applications comprised of first, second, and third tier programming logic for a three tier computer network architecture, the RAD tool comprising:

a first window module for displaying the first tier programming logic, the first tier programming logic comprising a web browser capable of containing and executing applets, wherein the first tier programming logic communicates with the second and third tier programming logic;

a second window module for displaying the second tier programming logic, the second tier programming logic comprising one or more second tier application scripts executed by a second tier runtime module that interfaces to a web server, wherein the second tier programming logic communicates with the first and third tier programing logic;

a third window module for displaying the third tier programming logic, the third tier programming logic comprising one or more third tier application scripts executed by a third tier runtime module that interfaces to a database management system, wherein the database management system receives requests from the second tier programming logic and the third tier runtime module, performs database functions in response to the requests, and returns results from the performed database functions;

so that as a user interacts with the first tier programming logic in the first window module, the second and third tier programming logic are executed in response thereto, breakpoints are selectively triggered within the executed second and third tier programming logic, and the selectively triggered breakpoints are displayed in the second and third window modules, respectively.

2. The computer-implemented RAD tool of claim 1, wherein the second tier application scripts are stored in an APP file.

3. The computer-implemented RAD tool of claim 1, wherein the third tier application scripts comprise one or more Stored Procedure and User Defined Function scripts.

4. The computer-implemented RAD tool of claim 1, wherein the third tier application scripts are stored in an APP file.

5. The computer-implemented RAD tool of claim 1, wherein the first tier programming logic further comprises "Run Local/Run Remote" functions for executing the second and third tier programming logic, wherein the "RunLocal" function is selected to execute the second and third tier programming logic on a development computer and the "RunRemote" function is selected to execute the second and third tier programming logic on different computers.

6. The computer-implemented RAD tool of claim 5, wherein the "RunLocal" function generates appropriate pages and stores them in a location where a local web sever can access the pages for display to a local web browser, and wherein the "RunLocal" function publishes a second tier application script in a location where a local second tier runtime module can execute the script.

7. The computer-implemented RAD tool of claim 5, wherein the "RunRemote" function executes a web browser and points the web browser at a Universal Resource Locator (URL) describing a first page of an application which has already been published on a web server, and wherein debugging parameters are automatically inserted into the URL.

8. The computer-implemented RAD tool of claim 1, wherein the three tier computer network architecture is comprised of a client computer comprising the first tier, a network server comprising the second tier, and a database server comprising the third tier.

9. The computer-implemented RAD tool of claim 1, wherein the first, second, and third window modules are displayed on a development computer.

10. The computer-implemented RAD tool of claim 1, wherein the first, second, and third tier programming logic are executed on a development computer.

11. The computer-implemented RAD tool of claim 1, wherein the first, second, and third programming logic are executed on different computers.

12. The computer-implemented RAD tool of claim 1, wherein the second tier programming logic is executed on a network server.

13. The computer-implemented RAD tool of claim 1, wherein the third tier programing logic is executed on a database server.

14. A computer-implemented method for constructing client-server applications comprised of first, second, and third tier programming logic for a three tier computer network architecture using a computer-implemented Rapid Application Development (RAD) tool, the method comprising:

displaying the first tier programming logic in a first window module, the first tier programming logic comprising a web browser capable of containing and executing applets, wherein the first tier programming logic communicates with the second and third tier programming logic;

displaying the second tier programming logic in a second window module, the second tier programming logic comprising one or more second tier application scripts executed by a second tier runtime module that interfaces to a web server, wherein the second tier programming logic communicates with the first and third tier programming logic;

displaying the third tier programming logic in a third window module, the third tier programming logic comprising one or more third tier application scripts executed by a third tier runtime module that interfaces to a database management system, wherein the database management system receives requests from the second tier programming logic and the third tier runtime module, performs database functions in response to the requests, and returns results from the performed database functions;

so that as a user interacts with the first tier programming logic in the first window module, the second and third tier programming logic are executed in response thereto, breakpoints are selectively triggered within the executed second and third tier programming logic, and the selectively triggered breakpoints are displayed in the second and third window modules, respectively.

15. The computer-implemented method of claim 14, wherein the second tier application scripts are stored in an APP file.

16. The computer-implemented method of claim 14, wherein the third tier application scripts comprise one or more Stored Procedure and User Defined Function scripts.

17. The computer-implemented method of claim 14, wherein the third tier application scripts are stored in an APP file.

18. The computer-implemented method of claim 14, wherein the first tier programming logic further comprises "Run Local/Run Remote" functions for executing the second and third tier programming logic, wherein the "RunLocal" function is selected to execute the second and third tier programming logic on a development computer and the "RunRemote" function is selected to execute the second and third tier programming logic on different computers.

19. The computer-implemented method of claim 18, wherein the "RunLocal" function generates appropriate pages and stores them in a location where a local web sever can access the pages for display to a local web browser, and wherein the "RunLocal" function publishes a second tier application script in a location where a local second tier runtime module can execute the script.

20. The computer-implemented method of claim 18, wherein the "RunRemote" function executes a web browser and points the web browser at a Universal Resource Locator (URL) describing a first page of an application which has already been published on a web server, and wherein debugging parameters are automatically inserted into the URL.

21. The computer-implemented method of claim 14, wherein the three tier computer network architecture is comprised of a client computer comprising the first tier, a network server comprising the second tier, and a database server comprising the third tier.

22. The computer-implemented method of claim 14, wherein the first, second, and third window modules are displayed on a development computer.

23. The computer-implemented method of claim 14, wherein the first, second, and third tier programming logic are executed on a development computer.

24. The computer-implemented method of claim 14, wherein the first, second, and third programming logic are executed on different computers.

25. The computer-implemented method of claim 14, wherein the second tier programming logic is executed on a network server.

26. The computer-implemented method of claim 14, wherein the third tier programming logic is executed on a database server.

27. An article of manufacture comprising a program storage medium readable by a computer and embodying one or more instructions executable by the computer to perform method steps for constructing client-server applications comprised of first, second, and third tier programming logic for a three tier computer network architecture using a computer-implemented Rapid Application Development (RAD) tool, the method comprising:

displaying the first tier programming logic in a first window module, the first tier programming logic comprising a web browser capable of containing and executing applets, wherein the first tier programming logic communicates with the second and third tier programming logic;

displaying the second tier programming logic in a second window module, the second tier programming logic comprising one or more second tier application scripts executed by a second tier runtime module that interfaces to a web server, wherein the second tier programming logic communicates with the first and third tier programming logic;

displaying the third tier programming logic in a third window module, the third tier programming logic comprising one or more third tier application scripts executed by a third tier runtime module that interfaces to a database management system, wherein the database management system receives requests from the second tier programming logic and the third tier runtime module, performs database functions in response to the requests, and returns results from the performed database functions;

so that as a user interacts with the first tier programming logic in the first window module, the second and third tier programming logic are executed in response thereto, breakpoints are selectively triggered within the executed second and third tier programming logic, and the selectively triggered breakpoints are displayed in the second and third window modules, respectively.

28. The article of manufacture of claim 27, wherein the second tier application scripts are stored in an APP file.

29. The article of manufacture of claim 27, wherein the third tier application scripts comprise one or more Stored Procedure and User Defined Function scripts.

30. The article of manufacture of claim 27, wherein the third tier application scripts are stored in an APP file.

31. The article of manufacture of claim 27, wherein the first tier programming logic further comprises "Run Local/ Run Remote" functions for executing the second and third tier programming logic, wherein the "RunLocal" function is selected to execute the second and third tier programming logic on a development computer and the "RunRemote" function is selected to execute the second and third tier programming logic on different computers.

32. The article of manufacture of claim 31, wherein the "RunLocal" function generates appropriate pages and stores them in a location where a local web sever can access the pages for display to a local web browser, and wherein the "RunLocal" function publishes a second tier application script in a location where a local second tier runtime module can execute the script.

33. The article of manufacture of claim 31, wherein the "RunRemote" function executes a web browser and points the web browser at a Universal Resource Locator (URL) describing a first page of an application which has already been published on a web server, and wherein debugging parameters are automatically inserted into the URL.

34. The article of manufacture of claim 27, wherein the three tier computer network architecture is comprised of a client computer comprising the first tier, a network server comprising the second tier, and a database server comprising the third tier.

35. The article of manufacture of claim 27, wherein the first, second, and third window modules are displayed on a development computer.

36. The article of manufacture of claim 27, wherein the first, second, and third tier programming logic are executed on a development computer.

37. The article of manufacture of claim 27, wherein the first, second, and third programming logic are executed on different computers.

38. The article of manufacture of claim 27, wherein the second tier programming logic is executed on a network server.

39. The article of manufacture of claim 27, wherein the third tier programming logic is executed on a database server.

* * * * *